United States Patent
Ayala et al.

(10) Patent No.: US 9,323,561 B2
(45) Date of Patent: Apr. 26, 2016

(54) CALIBRATING CLOUD COMPUTING ENVIRONMENTS

(75) Inventors: Richard Ayala, Medford, NJ (US); Kavita Chavda, Roswell, GA (US); Sandeep Gopisetty, Morgan Hill, CA (US); Seshashayee S. Murthy, Yorktown Heights, NY (US); Aameek Singh, University Place, WA (US)

(73) Assignee: International Business Machines Corporation, Armonk, NY (US)

( * ) Notice: Subject to any disclaimer, the term of this patent is extended or adjusted under 35 U.S.C. 154(b) by 845 days.

(21) Appl. No.: 12/855,780

(22) Filed: Aug. 13, 2010

(65) Prior Publication Data
US 2012/0042061 A1 Feb. 16, 2012

(51) Int. Cl.
G06F 9/455 (2006.01)
G06F 9/50 (2006.01)
G06F 11/34 (2006.01)
H04L 12/24 (2006.01)

(52) U.S. Cl.
CPC .......... *G06F 9/45558* (2013.01); *G06F 9/5072* (2013.01); *G06F 11/3409* (2013.01); *H04L 41/145* (2013.01); *G06F 11/3433* (2013.01); *G06F 11/3442* (2013.01); *G06F 2009/4557* (2013.01); *G06F 2209/501* (2013.01); *H04L 41/14* (2013.01)

(58) Field of Classification Search
CPC ..... H04L 12/2456; H04L 41/26; H04L 41/14; H04L 41/145; H04L 41/5038
USPC ....................................................... 709/224
See application file for complete search history.

(56) References Cited

U.S. PATENT DOCUMENTS

| | | | |
|---|---|---|---|
| 6,880,002 B2 | 4/2005 | Hirschfeld et al. | |
| 7,574,496 B2 | 8/2009 | McCrory et al. | |
| 2003/0051021 A1 | 3/2003 | Hirschfeld et al. | |
| 2006/0241902 A1* | 10/2006 | Crittenden et al. | 702/179 |
| 2008/0062997 A1* | 3/2008 | Nix | 370/395.2 |
| 2008/0184225 A1 | 7/2008 | Fitzgerald et al. | |
| 2009/0157998 A1 | 6/2009 | Batterywala | |
| 2009/0172666 A1* | 7/2009 | Yahalom | G06F 3/0605 718/1 |
| 2009/0300149 A1 | 12/2009 | Ferris et al. | |
| 2009/0300210 A1 | 12/2009 | Ferris | |

(Continued)

*Primary Examiner* — Tom Y Chang
(74) *Attorney, Agent, or Firm* — Noah A. Sharkan; Madeline F. Schiesser; Keohane & D'Alessandro PLLC

(57) ABSTRACT

In general, embodiments of present invention provide an approach for calibrating a cloud computing environment. Specifically, embodiments of the present invention provide an empirical approach for obtaining end-to-end performance characteristics for workloads in the cloud computing environment (hereinafter the "environment"). In a typical embodiment, different combinations of cloud server(s) and cloud storage unit(s) are determined. Then, a virtual machine is deployed to one or more of the servers within the cloud computing environment. The virtual machine is used to generate a desired workload on a set of servers within the environment. Thereafter, performance measurements for each of the different combinations under the desired workload will be taken. Among other things, the performance measurements indicate a connection quality between the set of servers and the set of storage units, and are used in calibrating the cloud computing environment to determine future workload placement. Along these lines, the performance measurements can be populated into a table or the like, and a dynamic map of a data center having the set of storage units can be generated.

25 Claims, 5 Drawing Sheets

(56) References Cited

U.S. PATENT DOCUMENTS

| | | | |
|---|---|---|---|
| 2009/0307166 A1* | 12/2009 | Routray | G06N 5/04 706/46 |
| 2010/0050172 A1 | 2/2010 | Ferris | |
| 2010/0262559 A1* | 10/2010 | Wilcock et al. | 705/348 |
| 2010/0333116 A1* | 12/2010 | Prahlad et al. | 719/328 |
| 2011/0126275 A1* | 5/2011 | Anderson et al. | 726/8 |
| 2011/0307291 A1* | 12/2011 | Rolia et al. | 705/7.25 |

* cited by examiner

CALIBRATING CLOUD COMPUTING ENVIRONMENTS

TECHNICAL FIELD

The present invention generally relates to cloud computing. Specifically, the present invention relates to an approach for calibrating cloud computing environments.

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, and storage devices.

While provisioning workloads on an integrated storage and computation cloud, most solutions make compute and storage placement decisions (i.e. which server to use and which storage node to use) independently of each other. This approach has been shown to lead to suboptimal configurations (e.g., if chosen server does not have enough bandwidth in its connection to the chosen storage node).

SUMMARY

In general, embodiments of present invention provide an approach for calibrating a cloud computing environment. Specifically, embodiments of the present invention provide an empirical approach for obtaining end-to-end performance characteristics for workloads in the cloud computing environment (hereinafter the "environment"). In a typical embodiment, different combinations of cloud server(s) and cloud storage unit(s) are determined. Then, a virtual machine is deployed to one or more of the servers within the cloud computing environment. The virtual machine is used to generate a desired workload on a set of servers within the environment. Thereafter, performance measurements for each of the different combinations under the desired workload will be taken. Among other things, the performance measurements indicate a connection quality between the set of servers and the set of storage units, and are used in calibrating the cloud computing environment to determine future workload placement. Along these lines, the performance measurements can be populated into a table or the like, and a dynamic map of a data center having the set of storage units can be generated.

A first aspect of the present invention provides a method for calibrating performance within a cloud computing environment, comprising: determining different combinations of a set of servers and a set of storage units within the cloud computing environment; generating a desired workload on the set of servers using a virtual machine; and taking performance measurements for each of the different combinations under the desired workload.

A system for calibrating performance within a cloud computing environment, comprising: a bus; a processor coupled to the bus; and a memory medium coupled to the bus, the memory medium comprising instructions to: determine different combinations of a set of servers and a set of storage units within the cloud computing environment; generate a desired workload on the set of servers using a virtual machine; and take performance measurements for each of the different combinations under the desired workload.

A computer program product for calibrating a cloud computing environment, the computer program product comprising: a computer readable storage media, and program instructions stored on the computer readable storage media, to: determine different combinations of a set of servers and a set of storage units within the cloud computing environment; generate a desired workload on the set of servers using a virtual machine; and take performance measurements for each of the different combinations under the desired workload.

A method for deploying a system for calibrating performance within a cloud computing environment, comprising: providing a computer infrastructure being operable to: determine different combinations of a set of servers and a set of storage units within the cloud computing environment; generate a desired workload on the set of servers using a virtual machine; and take performance measurements for each of the different combinations under the desired workload.

BRIEF DESCRIPTION OF THE DRAWINGS

These and other features of this invention will be more readily understood from the following detailed description of the various aspects of the invention taken in conjunction with the accompanying drawings in which.

Figure 1:
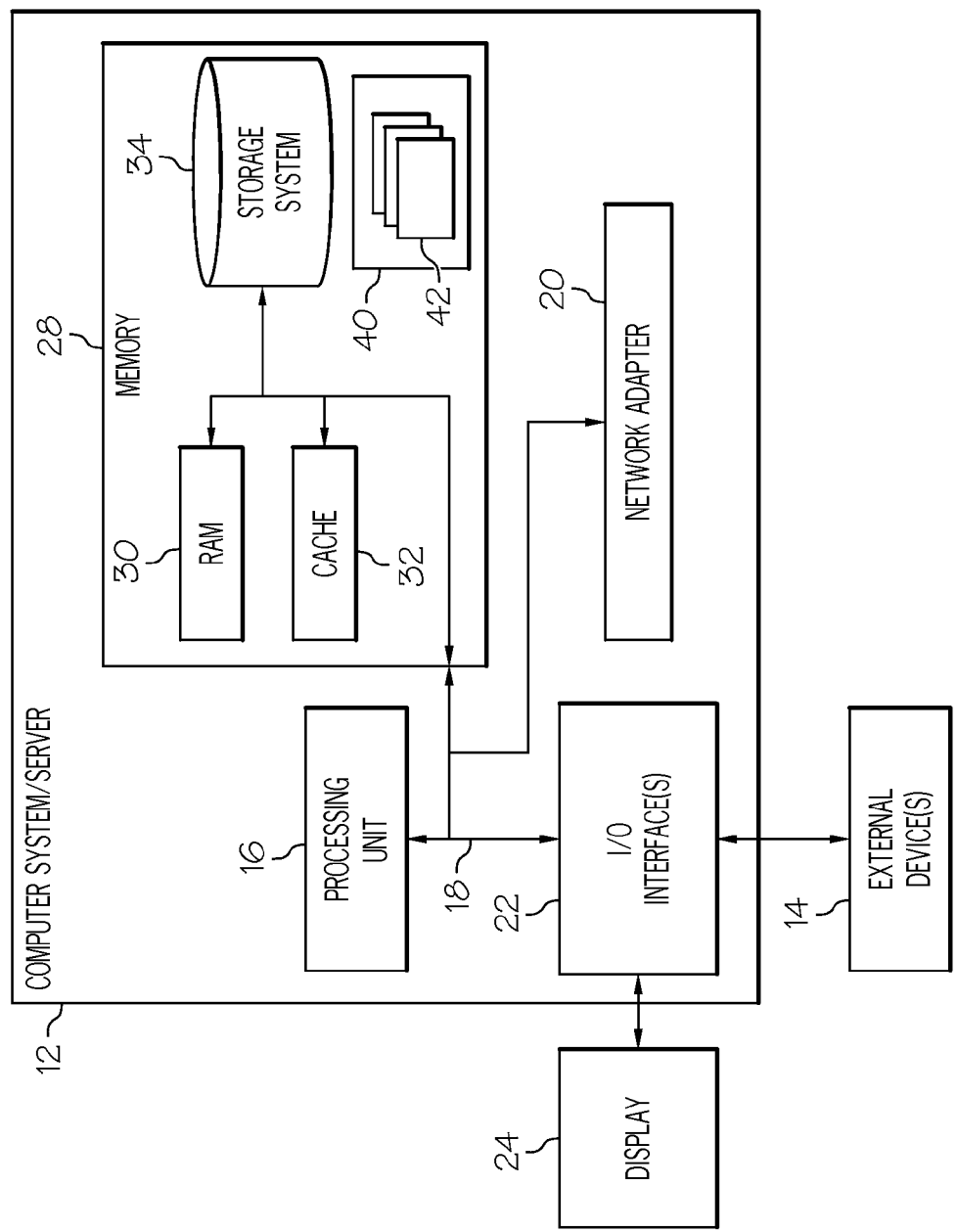
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As indicated above, embodiments of present invention provide a approach for calibrating a cloud computing environment. Specifically, embodiments of the present invention provide an empirical approach for obtaining end-to-end performance characteristics for workloads in the cloud computing environment (hereinafter the "environment"). In a typical embodiment, different combinations of cloud server(s) and cloud storage unit(s) are determined. Then, a virtual machine is deployed to one or more of the servers within the cloud computing environment. The virtual machine is used to generate a desired workload on a set of servers within the environment. Thereafter, performance measurements for each of the different combinations under the desired workload will be taken. Among other things, the performance measurements indicate a connection quality between the set of servers and the set of storage units, and are used in calibrating the cloud computing environment to determine future workload placement. Along these lines, the performance measurements can be populated into a table or the like, and a dynamic map of a data center having the set of storage units can be generated.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM. or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
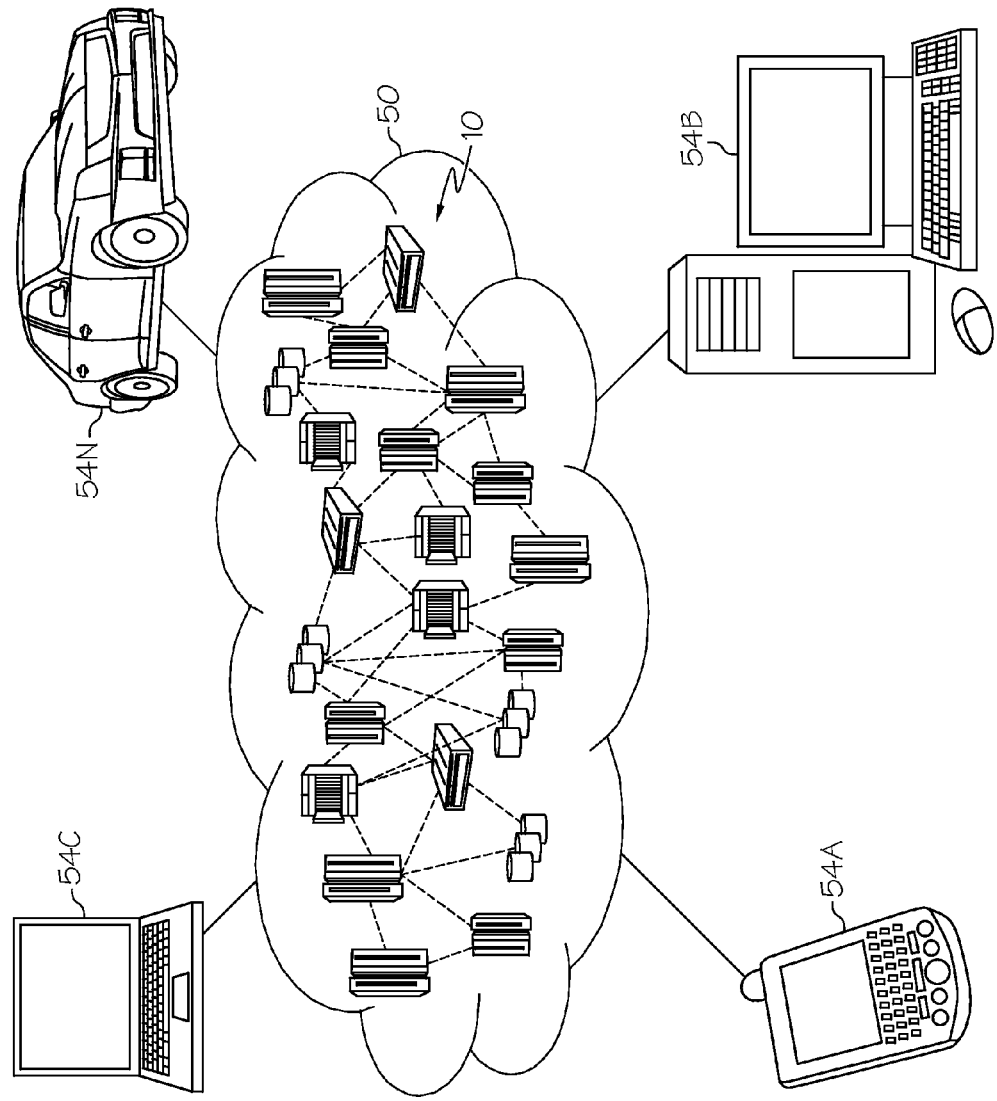
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
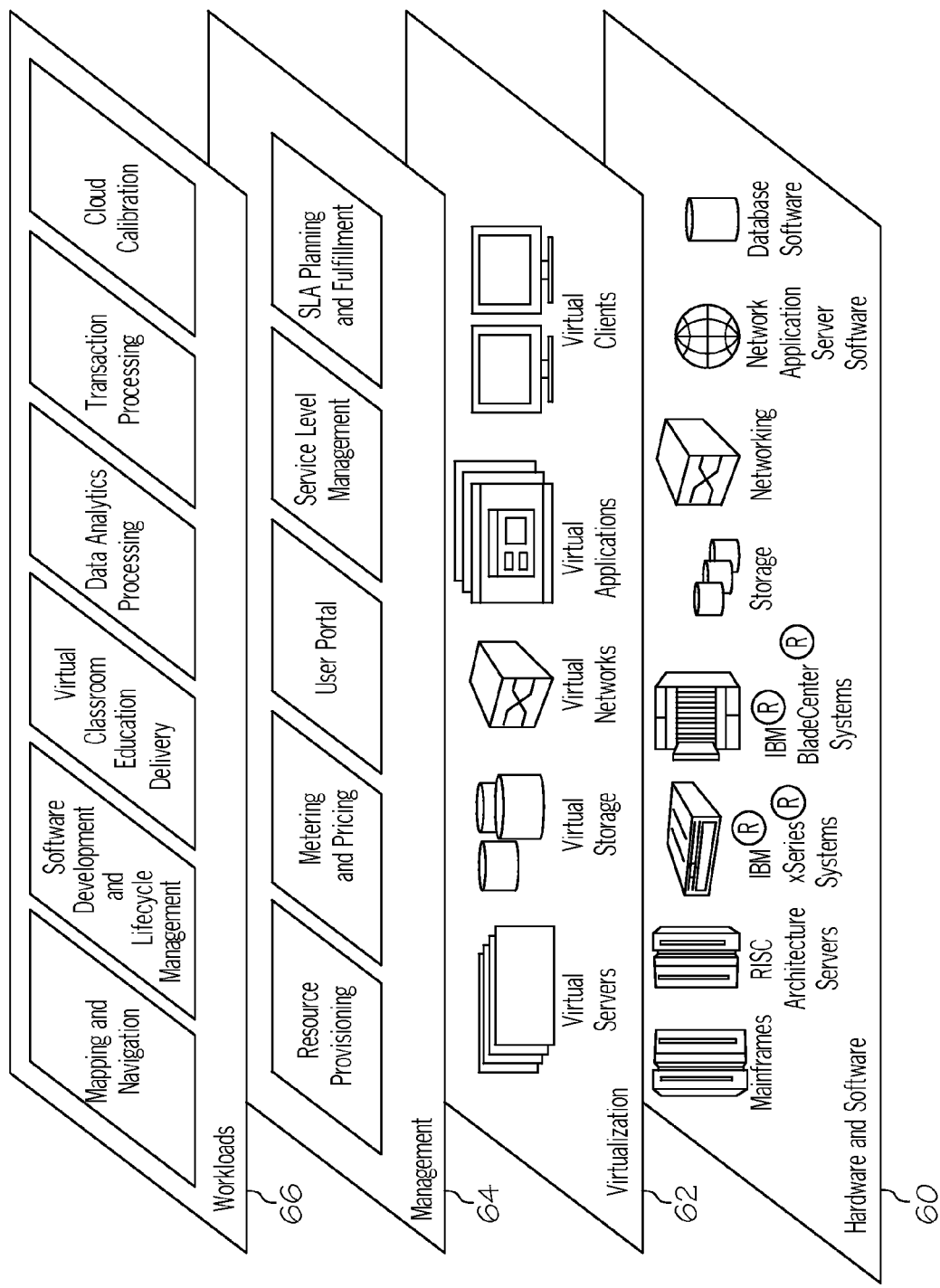
FIG. 3 depicts cloud abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cloud calibration. As mentioned above, all of the foregoing examples described with respect to FIG. 3 are illustrative only, and the invention is not limited to these examples.

It is understood all functions of the present invention as described herein are typically performed by the cloud calibration function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 2.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Figure 4:
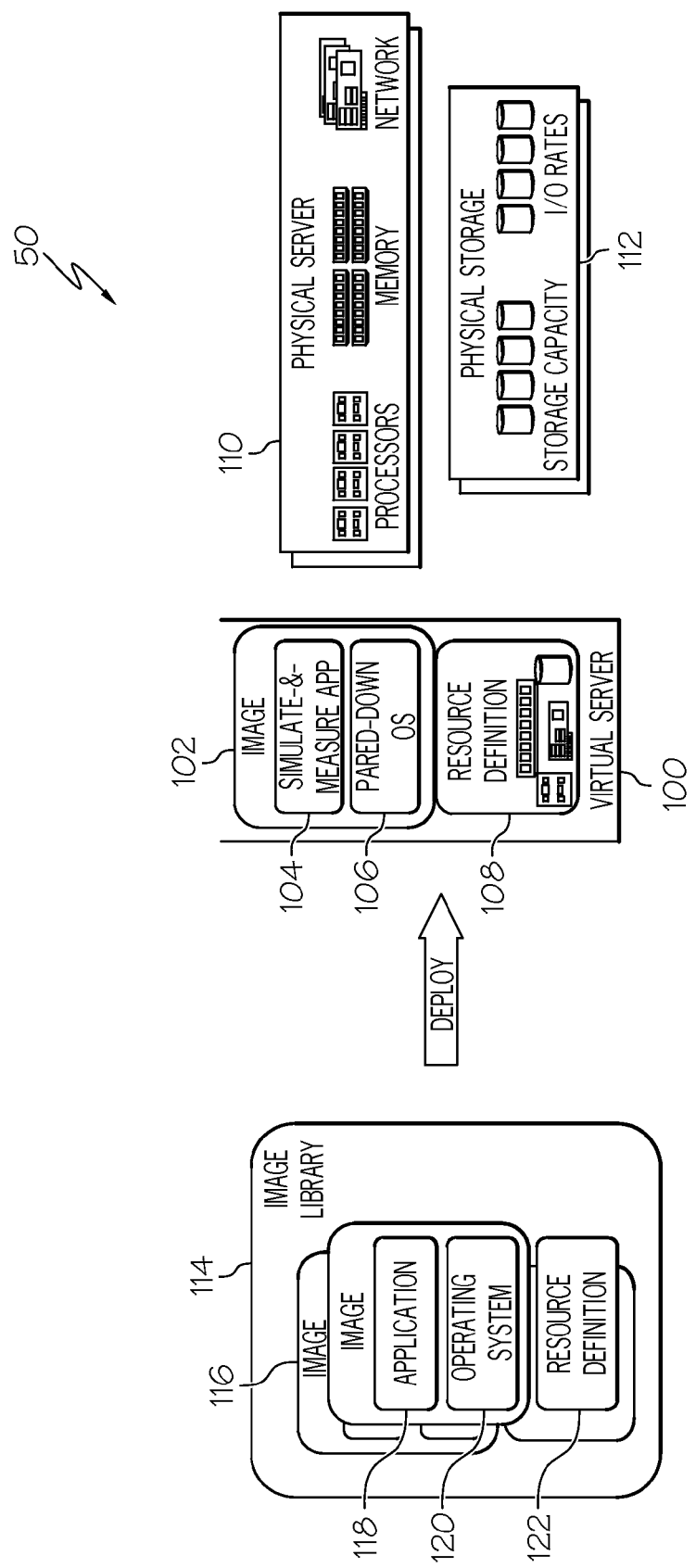
FIG. 4 depicts a process flow diagram according to an embodiment of the present invention.

Referring now to FIG. 4, an illustrative embodiment according to the present invention is shown. As depicted, FIG. 4 shows a cloud computing environment 50 having a virtual machine 100, a set of servers 110 (each having standard components such as processors, memory, networking, etc.), and a set of storage units 112 (e.g., physical storage). Under the embodiments of present invention, a quality of the connections between server-storage unit pairs is determined to help identify optimal server-storage unit combinations.

Along these lines, virtual machine 100 is created based on image library 114, which includes images 116 for applications 118 and operating systems 120, as well as resource definitions 122. As shown, virtual machine 100 typically comprises an image 102 having a simulation and measurement application (hereinafter application 104) and an operating system 106, as well as resource definitions 108. In a typical embodiment, operating system 106 is a pared down version of an operating system such as Linux. Regardless, different combinations of the set of servers 110 and the set of storage units 112 will be determined (e.g., by virtual machine 100. Thereafter, virtual machine 100 will be deployed within cloud computing environment 50 (e.g., on a server). Along these lines, virtual machine 100 can be deployed to any quantity of servers 110 in cloud computing environment. In a typically embodiment, servers 110 are partitioned into clusters. For example, a total of 100 servers could be grouped into 10 clusters with each cluster containing servers of the same hardware characteristics and similar configurations (OS type, connectivity with storage and network). Then, a few (e.g., 1 or 2) servers from within each cluster are used as representative of the entire cluster. Virtual machine 100 could be deployed to these "representative" servers. A similar clustering could be performed for storage units 112. At that point, application 104 will determine different combinations of the set of servers 110 and the set of storage units 112, and then generate/simulate a desired workload on set of servers 110. The different combinations could be made using the representative servers and storage units. However, this need not be the case. Rather, the different combinations could be made using the entire populations of servers 110 and storage units 112. In any event, the workload typically calls for the storage of simulated data in one or more storage units 112 via one or more servers 110. Application 104 will then take performance measurements for each of the different combinations under the workload. The performance measurements typically indicate a connection quality (e.g., speed, bandwidth, error rate, network latency, etc.) between the set of servers and the set of storage units. Once the measurements have been gathered, application 104 can then generate a table of the performance measurements, and create a dynamic map of a data center having the set of storage units based on the table. Once a clear idea of the connection quality is known (based on the performance metrics), optimal combinations/pairings can then be determined, and appropriate workload balancing can be applied among the combinations, thus calibrating cloud computing environment 50.

Under embodiments of the present invention, the following options and/or advantages can be provided:

Virtual machine 100 can be pre-provisioned for one or more servers 110.
Virtual machine 100 can be flash copied and made available to the desired server 100 instantaneously.
Virtual Appliance can:
  Include a pared-down Linux kernel that takes as input a workload profile with CPU, memory, I/O rates and simulates generating that workload, reports performance statistics into a central database.
  Be as small as 1 GB in size.
  Easy to deploy/undeploy into virtualized servers 100.
  Run temporary workloads just as long as needed to synchronize with application 104.
  Capacity scale-down: Workloads need not be allocated as much storage as they require, instead workloads are run only on a scaled-down amount of storage.
  Scale factors can be different depending on required accuracy.
Fewer device combinations to calibrate.
  Limit the number of servers, storage combinations to test by finding representatives (similar connectivity, similar characteristics) among a cluster of devices.
  Dynamically clustered based on performance behavior and de-clustered if performance deviates significantly.
  Continuous collection and table-population.
  Instead of on-demand evaluation, a continuous job can be run periodically.
  Instrumentation to control the choice of workload profiles, timing, scale-down factors, and choice of server and storage to test.
  Management analytics software can perform look-up operations on the table and obtain specific estimates for their desired workload profiles.

Figure 5:
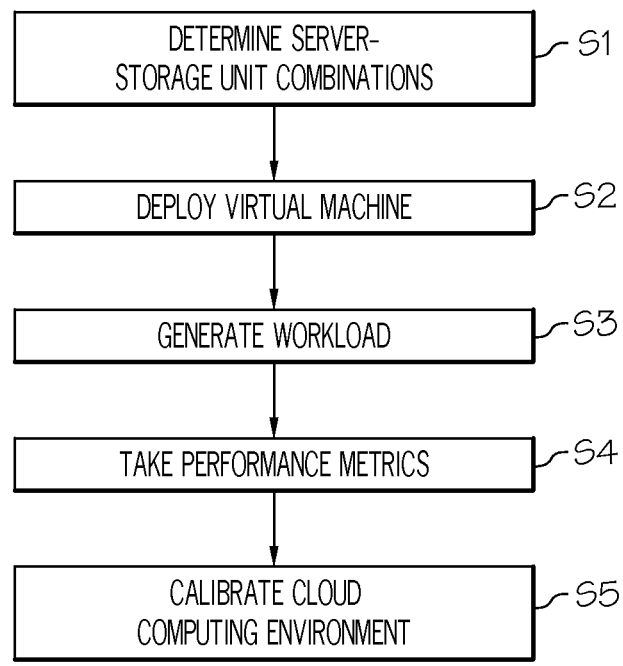
FIG. 5 depicts a method flow diagram according to an embodiment of the present invention.

Referring now to FIG. 5, a method flow diagram according to the present invention is shown. In step S1, different combinations of server(s) and storage unit(s) are determined. In step S2, a virtual machine is deployed to the cloud computing environment. In step S3, a desired workload is generated on the server(s) via the virtual machine. In step S4, performance measurements for each of the different combinations under the desired workload are taken. In step S5, the cloud computing environment is calibrated using the performance metrics to determine future workload placement.

While shown and described herein as a cloud calibration solution, it is understood that the invention further provides various alternative embodiments. For example, in one embodiment, the invention provides a computer-readable/useable medium that includes computer program code to enable a computer infrastructure to provide cloud calibration functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide cloud calibration functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for cloud calibration. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for calibrating performance within a cloud computing environment, comprising:

determining, using at least one computing device, different server-storage unit pair combinations of representative devices from at least one cluster of a set of servers and at least one cluster of a set of storage units within the cloud computing environment, the representative devices comprising a same hardware characteristic and a similar configuration to other devices of the at least one clusters, the same hardware characteristic comprising a connectivity with storage or a network;

generating, using the at least one computing device, a desired workload on the representative device combinations,
wherein the workload is created by a virtual machine, flash copied, and deployed to a server of each representative device combination, and
wherein the desired workload is configured to call for storage of data in a storage unit of each representative device combination via a server of said representative device combination;

taking, using the at least one computing device, performance measurements with an application of the virtual machine for each representative server-storage unit pair device combination under the desired workload;

calculating a connection quality between the storage unit and the server of each representative device combination based on the performance measurements;

assigning, for each representative device combination of a server and a storage unit, the calculated connection quality to combinations of a server from a cluster of servers and a storage unit from a cluster of storage units, wherein the clusters are associated with the representative device combination;

determining a plurality of optimal server-storage unit pairings from among the at least one cluster of servers and the at least one cluster of storage units based on the assigned qualities of connection;

calibrating the plurality of optimal server-storage unit pairings in the cloud computing environment for an anticipated workload placement; and balancing at least one workload among at least one optimized combination of a server from the at least one cluster of a set of servers and a storage unit from the at least one cluster of a set of storage units within the cloud computing environment based on the assigned connection qualities and the calibration.

2. The method of claim 1, further comprising generating, using the at least one computing device, a table that comprises the performance measurements.

3. The method of claim 2, further comprising creating, using the at least one computing device, a dynamic map of a data center comprising the set of storage units based on the table.

4. The method of claim 1, the performance measurements indicating a connection quality comprising at least one of: speed, bandwidth, error rate, and network latency, between the set of servers and the set of storage units.

5. The method of claim 4, further comprising calibrating, using the at least one computing device, the cloud computing environment using the performance metrics to determine future workload placement.

6. The method of claim 1, the virtual machine comprising:
a simulation and measurement application;
an operating system; and
a resource definition library.

7. The method of claim 1, the virtual machine being created, using the at least one computing device, using an image library comprising a set of images for a simulation and measurement application and an operating system, and comprising a resource definition library.

8. The method of claim 1, the workload created by the virtual machine being scaled and allotted a scaled storage based on a predetermined accuracy scale factor.

9. A system for calibrating performance within a cloud computing environment, comprising:
a bus;
a processor coupled to the bus; and
a memory medium coupled to the bus, the memory medium comprising instructions to:
group a set of servers and a set of storage units each into at least one cluster based on a same hardware characteristic and a similar configuration, the same hardware characteristic comprising a connectivity with storage or a network;
select at least one representative device from within each of the at least one clusters, the at least one representative device comprising a similarity to other devices of the at least one cluster;
determine different server-storage unit pair combinations of the set of servers and the set of storage units within the cloud computing environment;
generate a desired workload on at least one combination of the -representative devices,
wherein the workload is created by a virtual machine, flash copied, and deployed to a server of each representative device combination, and
wherein the desired workload is configured to call for storage of data in the storage unit of the combination of the representative devices via the server of the combination of the representative devices;
take performance measurements with an application of the virtual machine for the combination of the representative server-storage unit pair devices under the desired workload;
calculate a connection quality between the storage unit and the server of the combination of the representative devices based on the performance measurements;
assign the calculated connection quality to combinations of a server and a storage unit from the at least one clusters of servers and of storage units associated with the combination of representative devices;
determine a plurality of optimal server-storage unit pairings from among the at least one clusters of servers and of storage units based on the assigned qualities of connection;
calibrating the plurality of optimal server-storage unit pairings in the cloud computing environment for an anticipated workload placement; and
balance at least one workload among at least one optimized combination of a server from the set of servers and a storage unit from the set of storage units within the cloud computing environment based on the assigned connection qualities and the calibration.

10. The system of claim 9, the memory medium further comprising instructions to generate a table that comprises the performance measurements.

11. The system of claim 10, the memory medium further comprising instructions to create a dynamic map of a data center comprising the set of storage units based on the table.

12. The system of claim 9, the performance measurements indicating a connection quality comprising at least one of: speed, bandwidth, error rate, and network latency, between the set of servers and the set of storage units.

13. The system of claim 12, the memory medium further comprising instructions to calibrate the cloud computing environment using the performance metrics to determine future workload placement.

14. The system of claim 9, the virtual machine comprising:
a simulation and measurement application;
an operating system; and
a resource definition library.

15. The system of claim 9, the virtual machine being created using an image library comprising a set of images for a simulation and measurement application and an operating system, and comprising a resource definition library.

16. The system of claim 9, the workload created by the virtual machine being scaled and allotted a scaled storage based on a predetermined accuracy scale factor.

17. A computer program product for calibrating a cloud computing environment, the computer program product comprising a computer readable storage media, and program instructions stored on the computer readable storage media, to:
determine different server-storage unit pair combinations of representative devices from at least one cluster of a set of servers and at least one cluster of a set of storage units within the cloud computing environment, the representative devices comprising a same hardware characteristic and a similar configuration to other devices of the at least one clusters, the same hardware characteristic comprising a connectivity with storage or a network;
generate a desired workload on the representative device combinations,
wherein the workload is created by a virtual machine, flash copied, and deployed to a server of each representative device combination, and
wherein the desired workload is configured to call for storage of data in a storage unit of each representative device combination via a server of said representative device combination;
take performance measurements with an application of the virtual machine for each representative device combination under the desired workload;
calculate a connection quality between the storage unit and the server of each representative device combination based on the performance measurements;
assign, for each representative device combination, the calculated connection quality to combinations of a server from a cluster of servers and a storage unit from a cluster of storage units, wherein the clusters are associated with the representative device combination;

determine a plurality of optimal server-storage unit pairings from among the at least one cluster of servers and the at least one cluster of storage units based on the assigned qualities of connection;

calibrate the plurality of optimal server-storage unit pairings in the cloud computing environment for an anticipated workload placement; and balance at least one workload among at least one optimized combination of a server from the at least one cluster of a set of servers and a storage unit from the at least one cluster of a set of storage units within the cloud computing environment based on the assigned connection qualities and the calibration.

18. The computer program product of claim 17, further comprising program instructions stored on the computer readable storage media to generate a table that comprises the performance measurements.

19. The computer program product of claim 18, the memory medium further comprising instructions to create a dynamic map of a data center comprising the set of storage units based on the table.

20. The computer program product of claim 17, the performance measurements indicating a connection quality comprising at least one of: speed, bandwidth, error rate, and network latency, between the set of servers and the set of storage units.

21. The computer program product of claim 20, the memory medium further comprising instructions to calibrate the cloud computing environment using the performance metrics to determine future workload placement.

22. The computer program product of claim 17, the virtual machine comprising:
- a simulation and measurement application;
- an operating computer program product; and
- a resource definition library.

23. The computer program product of claim 17, the virtual machine being created using an image library comprising a set of images for a simulation and measurement application and an operating system, and comprising a resource definition library.

24. The computer program product of claim 17, the workload created by the virtual machine being scaled and allotted a scaled storage based on a predetermined accuracy scale factor.

25. A method for deploying a system for calibrating performance within a cloud computing environment, comprising:

providing a computer infrastructure being operable to:
  group a set of servers and a set of storage units each into clusters based on a same hardware characteristic and a similar configuration, the same hardware characteristic comprising a connectivity with storage or a network;
  select at least one representative device from within each of the clusters, the at least one representative device comprising a similarity to other devices of the respective cluster;
  determine different server-storage unit pair combinations of the at least one representative device from within each of the clusters within the cloud computing environment;
  generate a desired workload on at least one representative device combination from within each of the clusters,
    wherein the workload is created by a virtual machine, flash copied, and deployed to a server of each representative device combination, and
    wherein the desired workload is configured to call for storage of data in a storage unit of the representative server-storage unit pair devices combination via a server of the representative devices combination;
  take performance measurements with an application of the virtual machine for the representative device combinations under the desired workload;
  calculate a connection quality between a storage unit and a server of the representative device combination based on the performance measurements;
  assign the calculated connection quality to combinations of a server and a storage unit from the clusters associated with the representative devices;
  determine a plurality of optimal server-storage unit pairings from among the at least one clusters of servers and of storage units based on the assigned qualities of connection;
  calibrating the plurality of optimal server-storage unit pairings in the cloud computing environment for an anticipated workload placement; and
  balance at least one workload among at least one optimized combination of a server from the set of servers and a storage unit from the set of storage units within the cloud computing environment based on the assigned connection qualities and the calibration.

* * * * *